United States Patent
Diaz

[11] Patent Number: 5,533,207
[45] Date of Patent: Jul. 9, 1996

[54] POSITIONABLE SUNGLASSES AND CAP COMBINATION

[76] Inventor: Eusebio M. Diaz, 6450 Balboa Blvd., Van Nuys, Calif. 91406

[21] Appl. No.: 406,537

[22] Filed: Mar. 20, 1995

[51] Int. Cl.⁶ ........................................... A42B 1/24
[52] U.S. Cl. ........................ 2/10; 2/453; 351/155
[58] Field of Search ................ 2/10, 12, 9, 453, 2/209.13; 351/155, 158

[56]    References Cited

U.S. PATENT DOCUMENTS

| 2,648,091 | 8/1953 | Jones ........................................ 2/10 X |
| 5,129,102 | 7/1992 | Solo ............................................. 2/10 |
| 5,347,655 | 9/1994 | Garrett ....................................... 2/10 |
| 5,412,812 | 5/1995 | Gatchalian ................................. 2/10 |

FOREIGN PATENT DOCUMENTS 0066810  3/1957  France .................................. 2/10

*Primary Examiner*—Peter Nerbun
*Attorney, Agent, or Firm*—Roger A. Marrs

[57]    ABSTRACT

A combined eyeglass and cap combination is disclosed herein including a cap or other headgear provided with a crown and forwardly projecting bill or visor from which eyeglasses downwardly depend so as to be immediately in front of the wearer's eyes. A pivot device connects the eyeglass frame with the bill or visor whereby the eyeglasses may be positioned between an operative position in front of the eyes or a storage position adjacent the bill or visor underside. The pivot device includes a frictional detent to maintain the eyeglasses in either one of the two positions and may be of a fixed or detachable connection with the eyeglass frame or the eyeglass itself if composed of a transparent plastic.

4 Claims, 2 Drawing Sheets

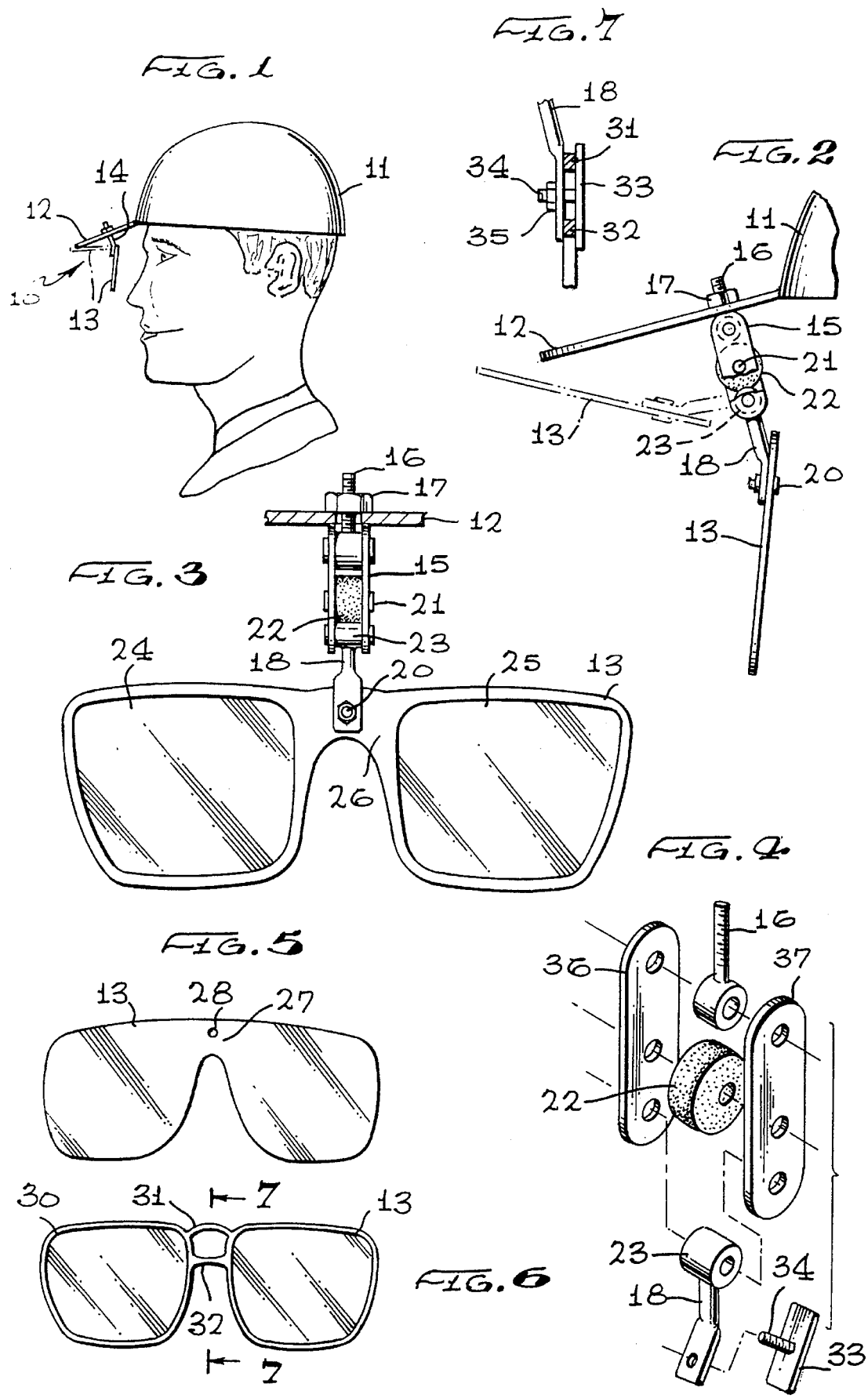

5,533,207

POSITIONABLE SUNGLASSES AND CAP COMBINATION

BACKGROUND OF THE INVENTION

1. Field of the Invention

The present invention relates to the field of headgear combined with eyeglasses, and more particularly to a novel cap having pivoted eyeglasses downwardly depending from the cap having either a position in front of the wearer's eyes or in a storage position out of the wearer's line of sight.

2. Brief Description of the Prior Art

In the past, it has been the conventional practice to wear headgear, such as a cap, helmet or the like, which includes a crown and a forward projecting bill or visor. The bill or visor is intended to shade the wearer's eyes and face and is in a fixed position with respect to the crown. To further protect the wearer's eyes, eyeglasses are sometimes worn which bridge the nose of the wearer and include ear pieces which extend from opposite ends of the eyeglasses past the sides of a head to hook about the wearer's ears. The cap and the eyeglasses are separate items and may be worn together or may be worn independently since there are no attachment means or communication devices between the two articles. Some previous attempts have been made to combine the eyeglasses with the headgear by using clips or pins to detachably connect the eyeglasses to some portion of the headgear. However, problems and difficulties have been encountered with these prior devices, which stem largely from the fact that clips are not permanently attached to the headgear and may readily fall or be knocked from their mounting on the headgear. Also, the clip or pins maintain the eyeglasses in a fixed position with respect to the user's eyes so that there is no positionable movement of the glasses from one location or position to another.

Still other problems have been encountered when attempting to permanently connect a pair of eyeglasses to the headgear whereby the attachment fixture may be incorporated into the construction of the headgear and yet the eyeglasses may be detachably connected therewith. Problems have been encountered when trying to maintain the eyeglasses in an operative position so as to be effective with respect to protection of the user's face or eyes.

Therefore, a long-standing need has existed to provide a novel combination of headgear and eyeglasses wherein a permanent fixture interconnects the two articles so that the eyeglasses will have an operative position in front of the user's eyes and a non-operative or storage position out of the user's line of sight.

SUMMARY OF THE INVENTION

Accordingly, the above problems and difficulties are avoided by the present invention which provides a novel headgear and eyeglass combination wherein the cap includes a crown supporting a forwardly facing visor or bill having an underside from which eyeglasses downwardly depend. An attachment fixture having a pivotal connection is secured to the bill or visor at one end and to the eyeglass frame at its other end so that the eyeglasses may be pivoted into an operative position immediately ahead of the user's eyes or to a non-operative or storage position residing adjacent the underside of the cap, bill or visor. In one form of the invention, the attachment means may take the form of a yoke having a tongue pivotally connected therewith whereby the yoke is attached to the bill or visor and the tongue is attached to the frame of the eyeglass. In another form, a ball and socket pivoting arrangement is envisioned having the socket attached to the bill or visor while the ball is attached to the tongue with a shank insertably engageable with a receptacle on the frames of the eyeglass. Detent means may be provided on the receptacle for releasably connecting the attachment device to the frame. In still another version, the attachment device may be fixedly secured directly to the eyeglasses themself when frames are not employed. In yet another version, the attachment device may include a clamp means which clamps with the centerpiece of the eye frames that normally bridge the nose of the user. Furthermore, the attachment means or device includes a frictional means for restricting pivotal movement whereby the eyeglasses will be retained in either their operative or non-operative position after being located to either position by the user.

Therefore, it is among the primary objects of the present invention to provide a novel headgear and eyeglass combination whereby the eyeglasses are downwardly depending from the bill or visor of the headgear and which are retainably movable between an operative position and a non-operative position with respect to the eyes of the user.

Another object of the present invention is to provide a novel headgear and eyeglass combination wherein a novel pivotal and frictionally restraining means is employed to movably connect eyeglasses to the bill or visor of headgear whereby the attachment is permanent and whereby the glasses may be either permanently affixed to the attachment device or attachably connected therewith.

Still another object of the present invention is to provide a novel combination headgear and eyeglass construction wherein the eyeglasses are carried by the bill or visor of the headgear by an attachment means which may take the form of a pivotal tongue and yoke combination or a ball and socket combination or by a clamping means which engages with the bridge of the eyeglasses that normally crosses the nose of the user.

Still a further object of the present invention is to provide an inexpensive means for joining eyeglasses with headgear whereby the eyeglasses may be moved from one position to another without removing the eyeglasses from attachment with the headgear.

BRIEF DESCRIPTION OF THE DRAWINGS

The features of the present invention which are believed to be novel are set forth with particularity in the appended claims. The present invention, both as to its organization and manner of operation, together with further objects and advantages thereof may best be understood with reference to the following description, taken in connection with the accompanying drawings in which:

FIG. 1 is a side elevational view of headgear taking the form of a cap and including a downwardly depending eyeglass arrangement suspended from the bill or visor of the cap;

FIG. 2 is an enlarged side elevational view illustrating the novel attachment device interconnecting the cap bill or visor with the eyeglasses, as illustrated in the embodiment of FIG. 1;

FIG. 3 is an enlarged front elevational view of the attachment device and eyeglasses wherein the eyeglasses include a frame connecting separate eye pieces;

FIG. 4 is an enlarged exploded view of the attachment device used in movably connecting the eyeglasses shown in FIGS. 3, 5 or 6;

3

Figure 8:
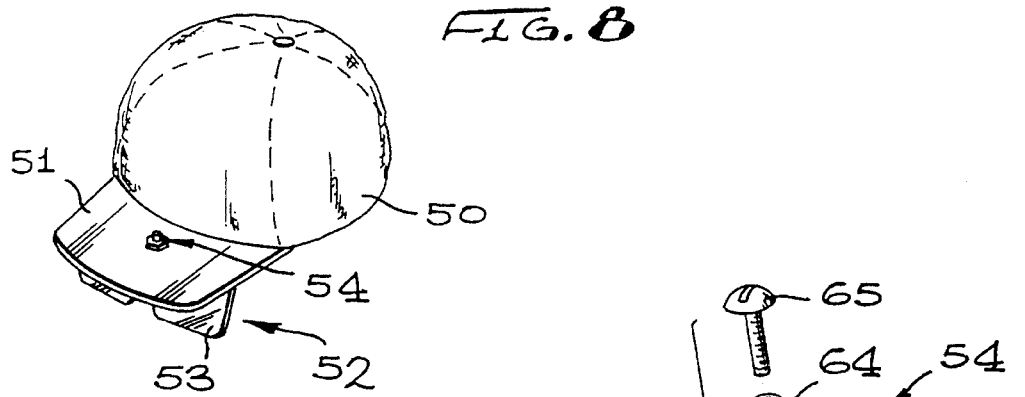
Figure 9:
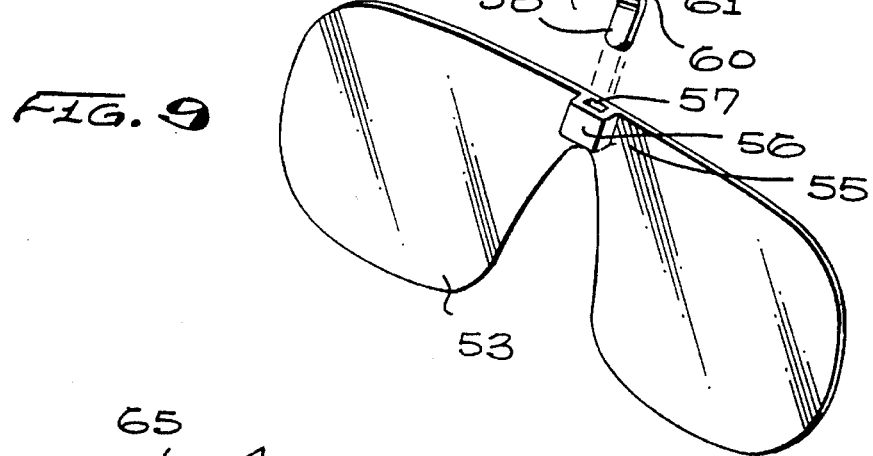
Figure 10:
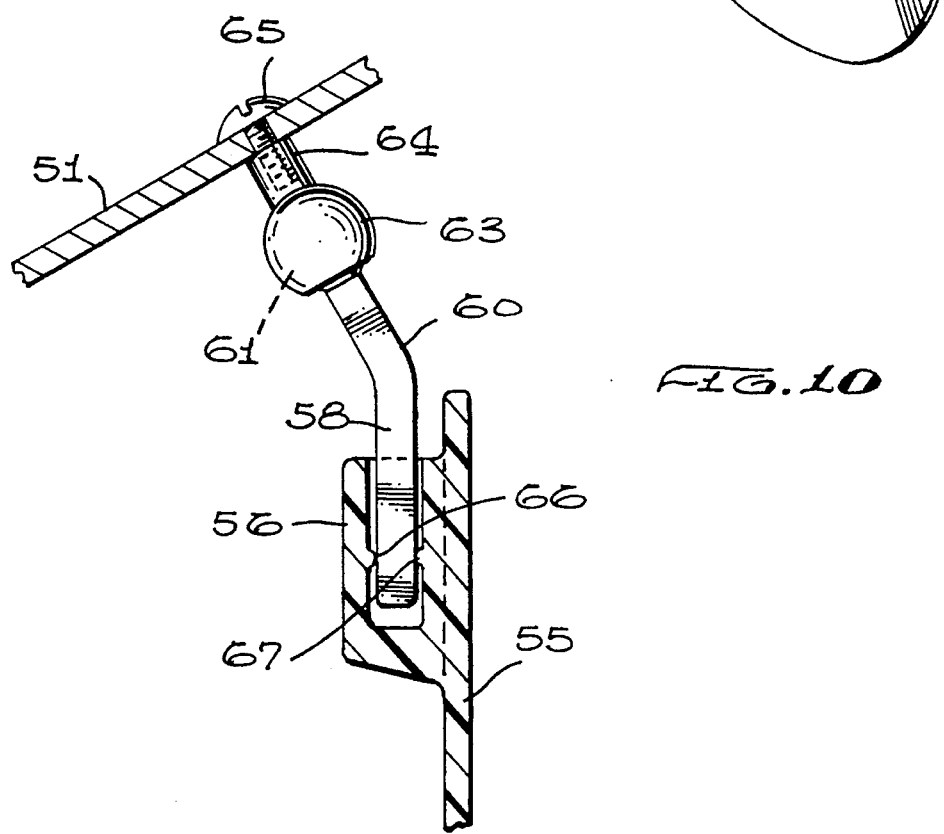

FIG. 5 is a front elevational view of eyeglasses or shades which do not include a frame that are attached to the headgear by the device shown in FIG. 4;

FIG. 6 is a front elevational view of a different version of eyeglass which may incorporate attachment to the bill or visor of the cap by attachment means shown in FIG. 4;

FIG. 7 is a sectional view of the frame bridge of the eyeglasses shown in FIG. 6 employing the clamp connector shown in the attachment device of FIG. 4;

FIG. 8 is a front perspective view of a soft cap, such as a baseball cap, incorporating the present invention;

FIG. 9 is an exploded view of a different embodiment of attachment connection taking the form of a ball and socket arrangement; and FIG. 10 is an enlarged cross-sectional view of the ball and socket attachment device as shown in FIG. 9.

DESCRIPTION OF THE PREFERRED EMBODIMENT

Referring to FIG. 1, the combined eyeglass and headgear combination incorporating the present invention is illustrated in the general direction of arrow 10. The headgear includes a hard hat crown 11 supporting a forward facing visor or bill 12 to which a sunglass or sun shade article represented by numeral 13 downwardly depends. The eyeglass or eye shade article 13 is attached to the bill or visor 12 by means of an attachment device 14 which permits the eyeglass or eye shade article 13 to be in an operative position immediately ahead of the eyes of the wearer, as shown in solid lines, or to a non-operative position out of the line of sight of the user, as shown in broken lines.

Referring now in detail to FIG. 2, it can be seen that the attachment device includes, in one form, a yoke 15 which is attached to the bill 12 by means of a threaded shank 16 secured by means of a nut 17. The yoke supports a connection piece or tongue 18 with the eyeglass or sun shade article 13 by means of a threadable fastener 20. Therefore, the yoke 15 is pivoted to the connection piece 18 by means of a pivot rod 21 connected between the legs of the yoke 15. As indicated previously, the solid line position of the article 13 maintains the eyeglasses or eye shades directly in the line of sight of the user whereas, in broken lines, the article is in a storage or non-operative position out of the line of sight of the user. It is to be understood that the storage position is in immediate adjacent relationship with respect to the underside of the visor or bill 12 while in its operative position, the article is in a substantially perpendicular relationship with respect to the underside of the bill.

Referring now in detail to FIG. 3, it is to be noted that the attachment device further includes a frictional means, such as a resilient washer 22 that bears against a roller 23 to provide a frictional force maintaining the article 13 in either the operative position or the non-operative position after movement by the user. The attachment device includes the yoke 15 on one side of the visor or bill 12 with the shank 16 thereof passing through a hole or opening in the bill so that the shank projects on the upper side of the bill to receive the nut 17.

FIG. 3 also shows that the article 13 is a pair of separate eyeglasses 24 and 25 which are separated by a frame bridge portion 26 of a pair of frames. The bridge portion is thickened and the connector element 18 is attached to the bridge portion by means of the fastener 20. With respect to FIG. 5, an eyeglass or eye shade article 13 is illustrated wherein no frame is used to support the transparent or translucent shade or glasses. In such an instance, the bridge portion is indicated by numeral 27 and is provided with a hole 28 through which the fastener 20 secures the connector 18 therewith.

With respect to FIG. 6, an article 13 is illustrated having a frame 30 which includes a bridge portion consisting of links 31 and 32 which interconnect the eye pieces. A space or opening is provided between the links and to attach the connection member 18 thereto, a clamp is illustrated, such as shown in FIG. 7, which takes the form of a plate 33 having a threaded shank 34 outwardly extending therefrom that passes through the opening between links 31 and 32 to terminate in a fastening connection with connecting member 18 by means of a threaded nut 35.

Referring now in detail to FIG. 4, it can be seen that the yoke comprises side plates 36 and 37 that are separated by the friction washer or member 22 as well as the connector shank 16 and the connection member 18. Only these components are necessary to hold the attachment device with the article 13, as shown in FIGS. 2, 3 and 4.

Referring to FIGS. 8–10 inclusive, another embodiment of the present invention is illustrated in the general direction of arrow 52 which includes headgear having a crown 50 and a forwardly facing bill or visor 51. The crown is preferably composed of a soft and full pliable or flexible material while the bill or visor 51 is composed of a semi-rigid but bendable material. The headgear is similar to what is commonly known as a "baseball" cap. The visor or bill 51 downwardly supports an article 53 which may take the form of eyeglasses or eye shade and the article is pivotally attached to the bill by means of a pivotal attachment device 54.

Referring in detail to FIGS. 9 and 10, it can be seen that the eyeglass or eye shade 53 includes a central portion 55 which fits over the bridge of the user's nose and this portion is formed with a receptacle 56 having an opening 57 for insertably receiving a tang 58 carried on one end of the attachment device 54. The tang or tongue 58 is carried on the end of a connection member 60 that is formed with a ball 61 which is pivotally carried within a socket 62 associated with a connection piece 64 of the attachment device. The connection piece 64 bears against the undersurface of the bill or visor 51, as shown in FIG. 10 while an attachment or fastening screw 65 passes through an opening in the bill or visor and threadably engages with the connection piece 64. The head of the screw 65 bears against the upper surface of the bill or visor.

FIG. 10 illustrates that the tang 58 is releasably held within the receptacle 56 by a detent means taking the form of nubs 66 and 67 which are arranged in fixed spaced-apart relationship so as to reduce the size of the opening 57 so that when the tang 58 is inserted therein, the nubs 66 and 67 will frictionally bear against the opposite sides of the tang to hold the attachment device in releasable engagement with the article 53.

Therefore, it can be seen from the foregoing that the combined headgear and sunglass or sun shade article of the present invention provides a novel combination for selectively shielding the eyes of the cap, helmet or headgear wearer. In the present description, headgear may take the form of a construction worker hard hat and the eyeglass article may take the form of safety glasses. With respect to the cap, the cap may be of the baseball type and the eyeglasses may be sun shades, tinted glass or the like. The attachment means pivotally carries the article in pivotal attachment to the bill or visor of the headgear and a plurality of different constructed eyeglass or sun shade articles is accommodated. The frictional means when using either the embodiment shown in FIG. 4 or the embodiment shown in FIG. 9 will maintain the eyeglass article in either a raised, non-operative position or in a lowered operative position. The ball and socket arrangement shown in FIGS. 9 and 10 are of a suitable size so as to frictionally restrain the eyeglass article from displacement from either the operative or non-operative position. However, the frictional force is overcome by the user using hand or finger pressure.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A headgear and eyeglass combination comprising:

headgear having a crown to be worn by a user and said crown having a forward facing, outwardly projecting bill having an upper surface and a lower surface;

an eyeglass article having a center portion separating eyeglass portions of transparent material;

an attachment device secured between said bill and said eyeglass center whereby said eyeglass article downwardly depends from said bill;

said eyeglass article having an operative position immediately ahead of the user's eyes and a non-operative position immediately adjacent with said bill lower surface;

said attachment device having restrained pivot means for moving said eyeglass article between said operative and said non-operative positions;

said attachment device includes a first fastener means fixedly securing one end of said attachment device to said bill and a second fastener means fixedly securing the other end of said attachment device to said eyeglass article; and said pivot means includes a compressable washer restraining movement between said attachment device and said eyeglass article.

2. The invention as defined in claim 1 wherein:

said eyeglass center portion includes a pair of spaced apart links defining an opening therebetween;

said attachment means including a clamp engageable with said links; and a closure fastener carried on said clamp and extending through said opening to hold said clamp onto said links.

3. The invention as defined in claim 1 wherein: said headgear is a hard-hat having said crown and said bill composed of rigid, inflexible material.

4. The invention as defined in claim 1 wherein:

said headgear is a soft cap having said crown and said bill composed of non-rigid, flexible material.

\* \* \* \* \*